United States Patent [19]

Bruner

[11] Patent Number: 6,036,215

[45] Date of Patent: Mar. 14, 2000

[54] DEVICE FOR LINKING TWO OR MORE BICYCLES IN TANDEM

[76] Inventor: Ronald Frank Bruner, 93 Freedom Rd., Sewell, N.J. 08080-1832

[21] Appl. No.: 08/880,012

[22] Filed: Jun. 20, 1997

[51] Int. Cl.[7] .................................................. B62K 13/00
[52] U.S. Cl. ........................................ 280/292; 280/240
[58] Field of Search .................................. 280/204, 292, 280/239, 1.5; 24/170, 191, 193

[56] References Cited

U.S. PATENT DOCUMENTS

| 605,799 | 6/1898 | Ripley | 280/292 |
|---|---|---|---|
| 675,453 | 6/1901 | Strurgess | 280/292 |
| 693,379 | 2/1902 | Davis | 280/292 |
| 4,721,320 | 1/1988 | Creps et al. | 280/204 |
| 4,856,816 | 8/1989 | Francis | 280/851 |
| 5,062,651 | 11/1991 | Varieur | 280/1.5 |
| 5,259,634 | 11/1993 | Berner et al. | 280/204 |
| 5,749,592 | 5/1998 | Marchetto | 280/204 |

FOREIGN PATENT DOCUMENTS

| 2507145 | 10/1982 | France | 280/292 |
|---|---|---|---|
| 16828 | 7/1902 | United Kingdom | 280/204 |

*Primary Examiner*—J. J. Swann
*Assistant Examiner*—Michael Cuff

[57] ABSTRACT

An improved apparatus for linking two or more bicycles together in tandem by means of a light-weight tubular member, wherein said member is attached a leading bicycle in a location near or on the seat and to the head tube of the trailing bicycle by a quick-release fastener. A separation means insures that the apparatus will automatically separate from the trailing bicycle in the event of excessive force being applied. An alignment means is provided to cause the trailing bicycle to track in substantial alignment with the leading bicycle. Cushioning material is provided on each coupling means to absorb shock and to minimize abrasive wear and to prevent marring of the respective bicycles.

7 Claims, 16 Drawing Sheets

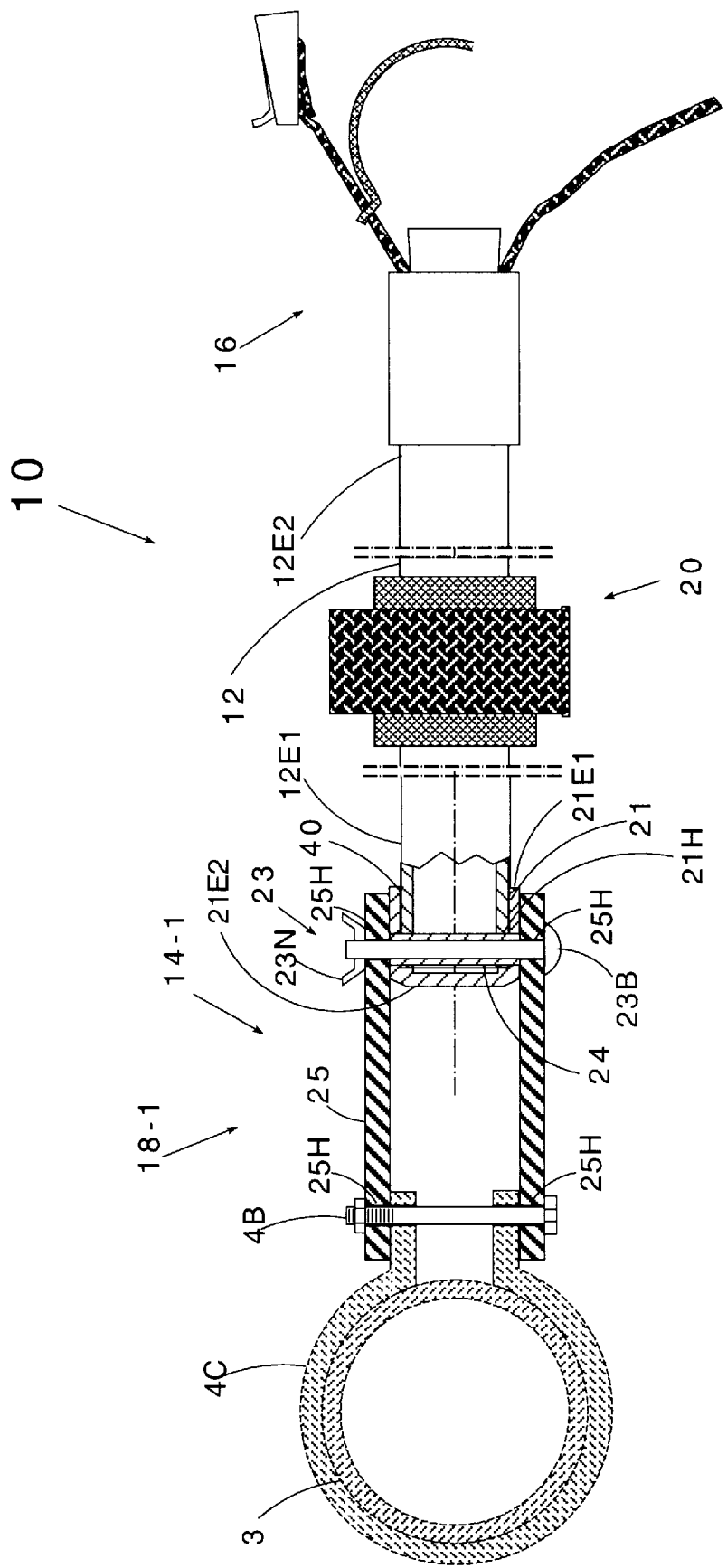

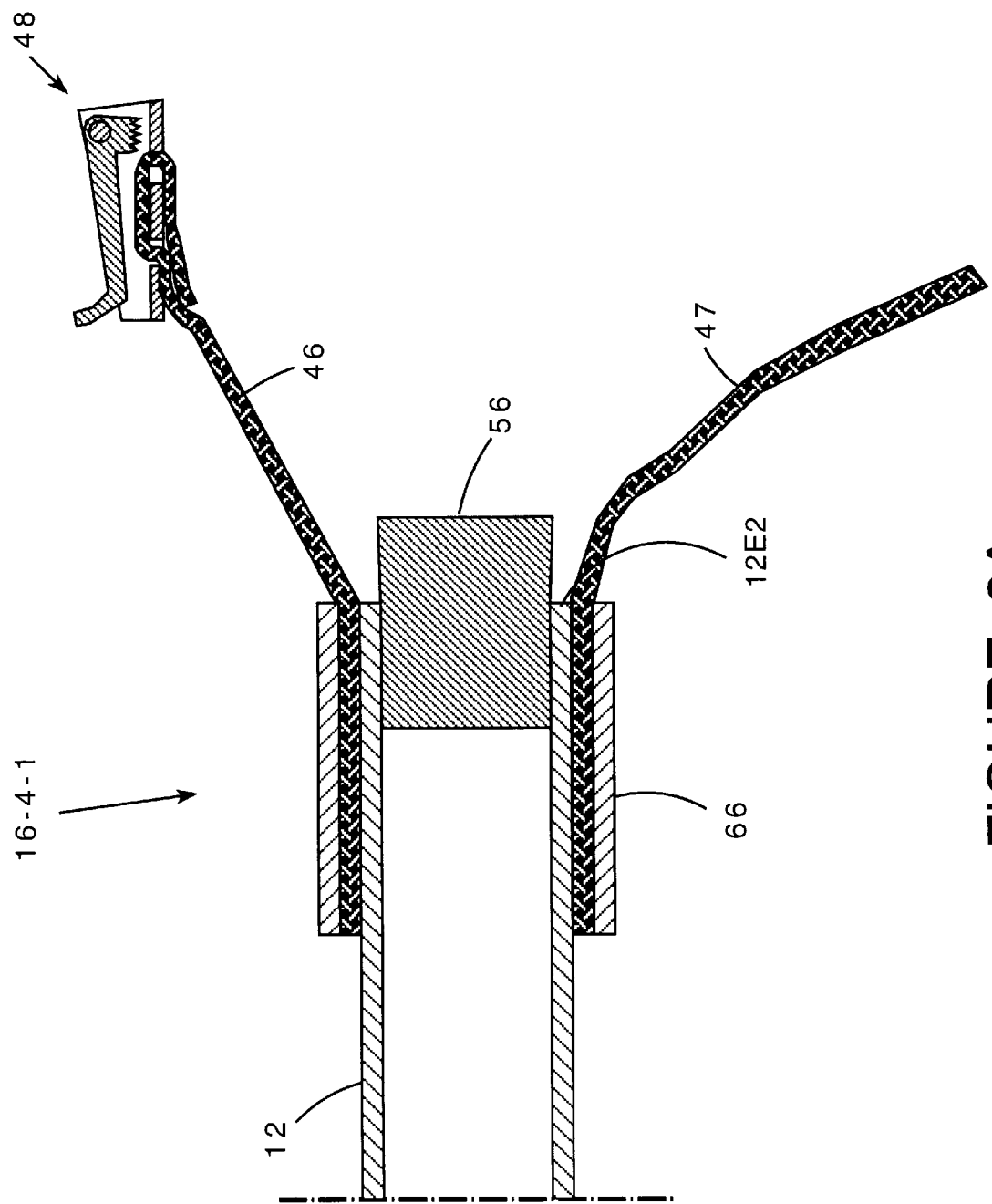

DEVICE FOR LINKING TWO OR MORE BICYCLES IN TANDEM

BACKGROUND

It is well established for multiple bicyclists, particularly on long distance rides, to ride in a close column formation. Riding in such a manner is known as "drafting" and serves to achieve reduced wind resistance, and thus reduced expenditure of energy, for the trailing riders. Since the leading rider does not benefit from the reduced wind resistance, riders typically take turns in the lead position, typically in a rotating fashion. Such close column riding is not without hazard however, since a minor mishap by the leading rider may result in a collision involving one or more trailing riders. Having a more skilled rider in the lead position is recognized to be safer. A device to enable the lead rider to benefit from the reduced wind resistance enjoyed by the trailing riders would therefore be beneficial.

Traditional tandem bicycles, which accommodate two or more riders, have long been known. Traditional tandem bicycles suffer the disadvantages of high cost, large storage space requirements, and transporting difficulties. A device that maintains a fixed separation between individual bicycles, thus eliminating concern that the front wheel of a trailing bicycle will encounter the rear wheel of a bicycle immediately ahead, would require close communication between the leading and trailing cyclists, so that the trailing cyclist(s) can anticipate turns, stops and other deviations from steady riding and thereby steer to closely track the rear wheel of the bicycle ahead. Accordingly, an alignment means to cause the trailing bicycle to track the leading bicycle is believed to be advantageous. Linking bicycles in such an arrangement has the advantages of permitting the participating cyclists to pedal independently, each at his or her own cadence and gear ratio, while staying together and gaining the reduced wind resistance benefits of close drafting. The participating cyclists may be of widely varying abilities and have different size bicycles. A participating cyclist may effectively push the cyclist ahead, or pull the cyclist behind, the average speed of the group being determined by the total effort put forth by all participants. In such an arrangement it is the responsibility of any or all trailing cyclists to maintain reasonably accurate tracking of their front wheel with the rear wheel of the bicycle ahead of them, since such tracking minimizes lateral forces being exerted by one bicycle on another, which could disrupt balance.

It is believed desirable that such a device be easily attached or detached from the bicycles, preferably without tools. In the event of an impending mishap it is desirable that the linking device be quickly releasable by a trailing rider. In the event of an actual mishap which results in excessive force being applied to the linking device, it is desirable that the linking device automatically detach itself from the trailing bicycle.

Various prior art devices for linking two or more bicycles in tandem, i.e., one behind another, are known. Prior art devices are believed to be overly complex, expensive to manufacture, usually require one or more tools to attach to the bicycles and lack the ability to be quickly detached in an emergency situation. Such prior art devices are not readily available because they have not achieved widespread market acceptance. A low cost device for linking two or more bicycles in tandem, requiring no tools to attach, having a safety feature combining a quick release and an automatic emergency separation mechanism, and an integral accessory for storing the device on a bicycle when not in use, as is provided by the present invention, is believed to be advantageous.

SUMMARY OF THE INVENTION

The present invention, in contrast to the prior art, is a simplified and improved apparatus for linking two bicycles together in a tandem arrangement, comprising a light-weight tubular member and two attachment assemblies which facilitate coupling the apparatus to a leading and to a trailing bicycle. The improvement over the prior art comprises: a) a first attachment means for attaching the apparatus to the leading bicycle, the first attachment means being affixed to a first end of the tubular member; b) a second attachment means for attaching the apparatus to the trailing bicycle, comprising a strap and a quick-release buckle, the second attachment means being affixed to a second end of the tubular member; c) separation means for automatically detaching the second end of the tubular member from the trailing bicycle when a predetermined force has been reached; and d) alignment means for causing the trailing bicycle to track in substantial alignment with the leading bicycle.

The light-weight tubular member is typically made of a suitable material, such as aluminum, a composite material, or a polymer. Due to its desirable combination of properties, polyvinyl chloride (PVC) tubing is the preferred material. A first attachment assembly is affixed to a first end of the tubular member and facilitates coupling the apparatus to a leading bicycle. In different embodiments the first attachment assembly may take different forms and may be attached to the leading bicycle in different manners proximate to the seat. In one arrangement a first embodiment of the first attachment means is functionally combined with a first embodiment of the alignment means and comprises at least one alignment arm attached to the seat post clamp on the seat tube of the leading bicycle, using the seat post clamp bolt. The arm(s) is(are) attached, without requiring tools, to the first end of the tubular member by inserting a bolt or pin through corresponding holes in the arm(s) and in the tubular member.

A second embodiment of the first attachment assembly comprises a flexible strap, an affixing means for affixing the strap to the tubular member, and a suitable resilient cushioning bumper. The strap has a first end and a second end, the second end of the strap having a manually releasable fastener, such as a buckle, affixed thereto. The flexible strap may be of any suitable material, although a woven or braided polymeric fiber, such as nylon or polyester, strap material having a weather resistant coating, similar to that sold for use as bicycle pedal toe straps, has been found suitable. The manually releasable fastener of the first attachment assembly may be any suitable buckle such as a metal buckle of the type used in bicycle pedal toe straps. The second embodiment of the first attachment assembly is typically attached to the seat tube or to the seat post or to the seat support structure of the leading bicycle. The first end of the flexible strap is looped around the attachment location on the leading bicycle and then attaching the first end of the strap to the second end with the manually releasable fastener.

A second attachment assembly is affixed to a second end of the tubular member and facilitates coupling the apparatus to a trailing bicycle. The second attachment assembly comprises a flexible strap, an affixing means for affixing the strap to the tubular member, and a suitable resilient cushioning bumper. The strap has a first end and a second end, the second end of the strap having a manually releasable fastener, such as a buckle, affixed thereto. The flexible strap may be of any suitable material, although a woven or braided polymeric fiber, such as nylon or polyester, strap material having a weather resistant coating, similar to that sold for use as bicycle pedal toe straps, has been found suitable. The fastener of the second attachment assembly is preferably a quick-release type fastener, such as a cam buckle.

The second attachment assembly is typically attached to the head tube of the trailing bicycle by looping the first end of the flexible strap around the head tube and then attaching the first end of the strap to the second end with the quick-release fastener. The resilient cushioning bumper of each attachment assembly, which absorbs shock, is preferably an elastomeric material such as neoprene. An optional resilient pad may be provided to further absorb shock and to minimize abrasive wear on the strap and to prevent marring of the respective bicycle seat post or head tube to which the attachment assembly is attached.

A mid-bar storage assembly is provided for convenient stowing of the apparatus on one of the bicycles when the apparatus is not being used to couple two bicycles together. The storage assembly may utilize a strap similar to the strap described in conjunction with the second embodiment of the first attachment assembly. Alternatively the storage assembly may take the form of a storage clamp and strap assembly having a strap of the hook and loop type (sold under the trademark Velcro), similar to a bicycle pump storage strap assembly.

An alignment means is provided to cause the trailing bicycle to track in substantial alignment with the leading bicycle. When the apparatus is attached to the leading and trailing bicycles the alignment means causes the tubular member to remain substantially aligned with the frame of the leading bicycle, thereby causing the trailing bicycle to track in substantial alignment with the leading bicycle. A first embodiment of the alignment means comprises at least one alignment arm attached to the first end of the tubular member for attachment to the seat post clamp on the seat tube of the leading bicycle. The arm(s) is(are) provided with a hole to receive the seat post clamp bolt. In this embodiment it is preferred that the alignment arm(s) be made of a rigid or semi-rigid material and the tubular member be made of a resilient material that provides an aligning force when the tubular member is deflected from alignment with the frame of the leading bicycle.

A second embodiment of the alignment means comprises at least one alignment arm having a first and a second strap and buckle means at each end of the alignment arm(s). The first end of the alignment arm is attached to the tubular member. The alignment arm is shaped to pass around the seat post and the second end is attached to the top tube of the leading bicycle. When the apparatus is attached to the leading and trailing bicycles the alignment means causes the tubular member to remain substantially aligned with the frame of the leading bicycle, thereby causing the trailing bicycle to track in substantial alignment with the leading bicycle. In this embodiment it is preferred that the alignment arm(s) and the tubular member both be made of a resilient material that provides an aligning force when the tubular member is misaligned from the frame of the leading bicycle.

A third embodiment of the alignment means comprises an attachment clamp and an elastic cord. The clamp is attached to the tubular member at a point approximately one third the member length from the second end. The elastic cord has a first end, a second end and a midpoint. The midpoint of the elastic cord is attached to the tubular member by the attachment clamp and the first and second ends of the elastic cord is attached to respective sides of the handlebar of the trailing bicycle, so that, when the second bicycle is tracking out of alignment with the first bicycle, an aligning force is exerted by the elastic cord upon the second bicycle to keep the second bicycle in substantial alignment with the first bicycle. The attachment clamp may also comprise an elastic release, that releases the elastic cord when a predetermined force has been reached. In this embodiment the elastic release comprises part of the separation means for automatically detaching the second end of the tubular member from the trailing bicycle.

A fourth embodiment of the alignment means comprises attaching the second embodiment of the first attachment means to the seat support structure of the leading bicycle so that the seat support structure will limit the lateral travel of the tubular member relative to the leading bicycle. A resilient sleeve, typically made of a elastomeric material or high density foam, may be attached to the tubular member adjacent the first attachment means to further limit lateral motion of the tubular member.

Since at least the second attachment means of the apparatus is flexible, essentially all angular orientations of the apparatus which might be encountered by bicycles linked in tandem, including partial rotation about its own axis, are accommodated.

The invention will be more readily understood on reading the following description with reference to the accompanying drawings.

BRIEF DESCRIPTION OF THE DRAWINGS

FIG. 2A is a plan view, partly in section, that shows the elements of a first embodiment of the present invention which incorporates a first embodiment of a first attachment assembly, which also functions as a first alignment means.

FIGS. 8A and 8B are sectional views of two arrangements of a fourth embodiment of a second attachment assembly.

DETAILED DESCRIPTION OF THE INVENTION

Figure 1:
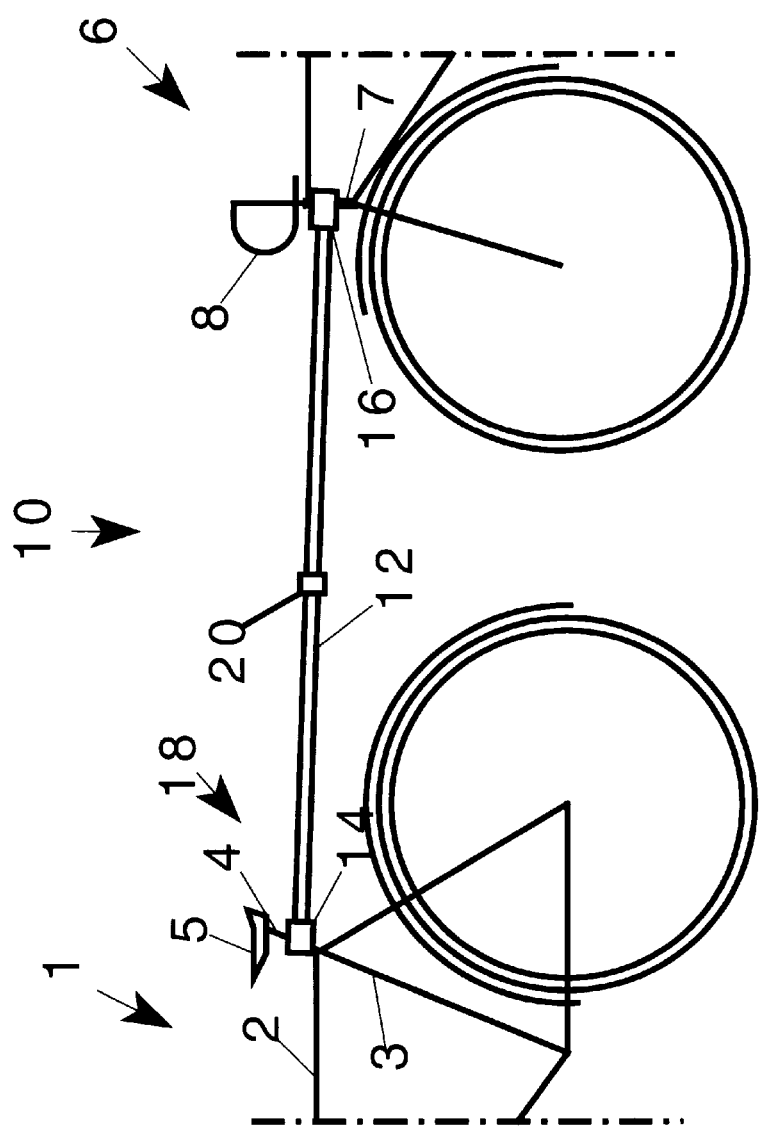
FIG. 1 shows two bicycles linked in a tandem arrangement utilizing the linking device of the present invention.

FIG. 1 shows two bicycles linked in a tandem arrangement utilizing a linking device of the present invention.

Although similar in outward appearance to prior art devices in this view, the improvements of the present invention over the prior art will become apparent from the subsequent Figures and the accompanying description. A leading bicycle 1, having a top tube 2, a seat tube 3, a seat post 4, and a seat 5, is linked to a trailing bicycle 6, having a head tube 7 and handle bars 8, by an apparatus 10 of the present invention. The apparatus 10, in its various embodiments, is attached to the seat tube 3 (see FIG. 4), to the seat post 4, to the seat post clamp 4C (see FIGS. 2A and 2B), or to the seat 5 (see FIG. 13) of the leading bicycle and is attached to the head tube 7 of the trailing bicycle (see FIGS. 10 and 11). The apparatus 10 comprises a tubular member 12, a first attachment assembly 14, a second attachment assembly 16, an alignment means 18 (best seen in FIGS. 2A, 2B, 4, 12, and 13), and a stowing strap assembly 20. In all embodiments of the invention the tubular member 12 is preferably a length of PVC tubing sold as ¾" inch diameter schedule 40 PVC pipe. Although any suitable length tubular member 12, sufficient to prevent the front wheel of a trailing bicycle from contacting the rear wheel of a leading bicycle, may be used, a length of approximately one hundred fifteen centimeters (115 cm) centimeters (forty-five (45) inches) has been found to be suitable for most bicycle combinations.

Figure 2B:
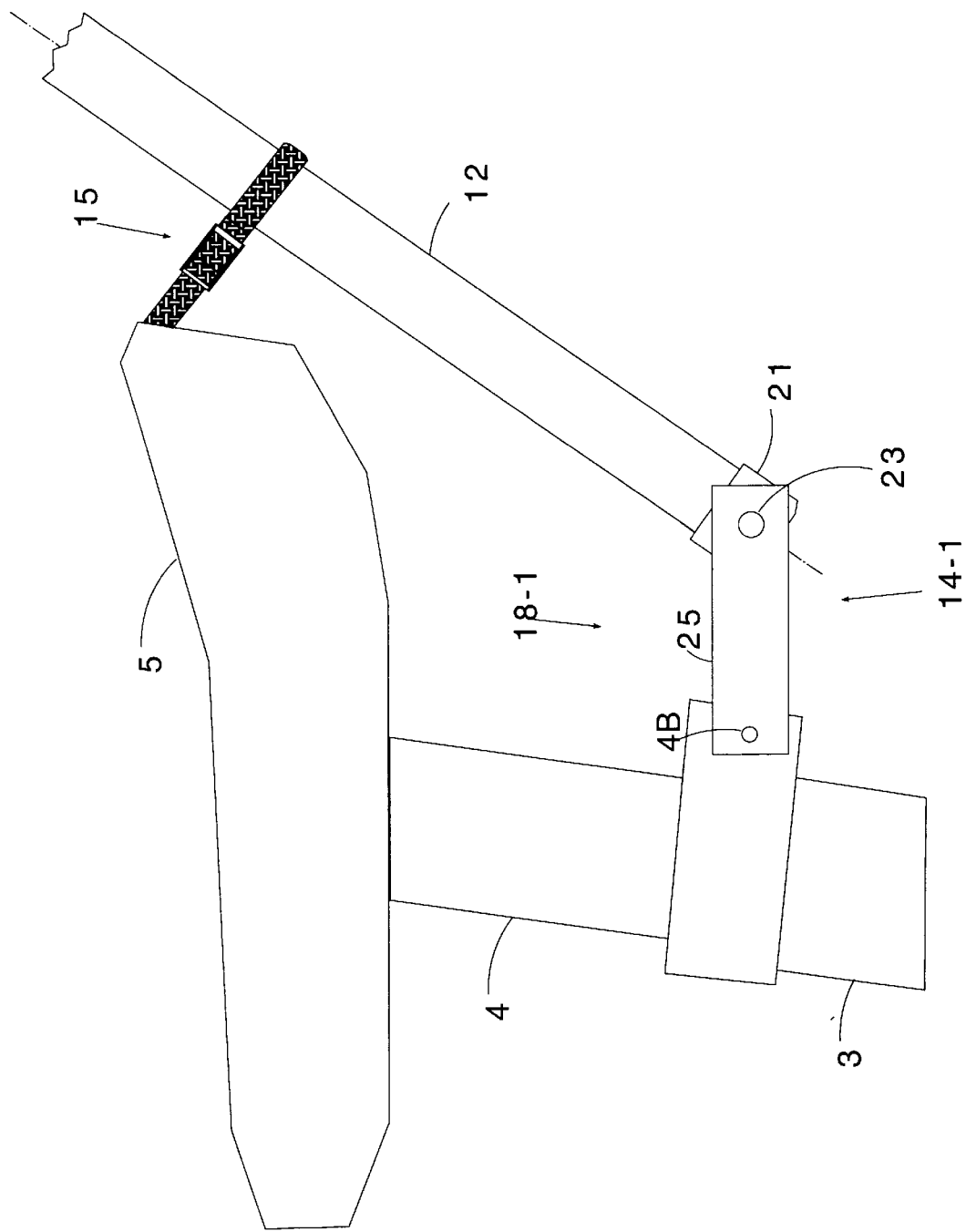
FIG. 2B is an elevational view that shows some elements of the first embodiment of the present invention in a raised position when not attached to a trailing bicycle.

A first arrangement of the apparatus 10, as depicted in FIGS. 2A and 2B, comprises a tubular member 12, having a first end 12E1 and a second end 12E2, a first embodiment 14-1 of a first attachment assembly 14, a second attachment assembly 16, a first embodiment 18-1 of an alignment means 18, and a stowing strap assembly 20. In this embodiment the first attachment assembly 14-1 functions as both a first attachment means and as an alignment means and the second attachment assembly 16 comprises a second attachment means.

The elements of a first embodiment 14-1 of the first attachment assembly 14, best seen in section in FIG. 2A, comprise:

a PVC pipe cap 21, having an open end 21E1 and a closed end 21E2, a fastener 23, a bushing 24 and at least one arm 25. The fastener 23 is preferably a carriage bolt 23 B, as shown, or a thumb screw (not shown) and associated wing-nut 23N. A first end 12E1 of tubular member 12 is inserted into the open end 21E1 of the cap 21 until it contacts the closed end 21E2. The cap 21 is affixed to the tubular member 12, preferably with a suitable solvent-based PVC pipe cement 40. A suitable diameter hole 21H is drilled through the pipe cap 21 and the tubular member 12 and a bushing 24 is inserted into the hole 211H. In this embodiment it is preferred to utilize two arms 25, each having holes 25H adjacent to each end, made of a suitable rigid or semi-rigid material, such as steel, although other metals, engineering polymers or composite materials are also considered suitable. The arms 25 are attached to the seat post clamp 4C of the leading bicycle by removing the seat post clamp bolt 4B, positioning the arms on either side of the seat post clamp 4C, and passing the seat post clamp bolt 4B through respective first holes 25H in the arms 25. If necessary a longer bolt may be substituted for bolt 4B. The two arms 25 are then positioned on either side of pipe cap 21 and the fastener 23 is inserted through a hole 25H in the first arm, through the bushing 24 and through a hole 25H in the second arm. A suitable nut 23N, such as a wingnut, is installed on the bolt 23B and hand tightened to attach the arms 25 on the first end 12E1 of tubular member 12. Although a two-arm arrangement is shown and is preferred, it will be appreciated that a single arm arrangement or a single-piece two-arm arrangement may be used. Although a bolt 23B and wingnut 23 are shown to attach the arms 25 to the tubular member 12, other fasteners which require no tools, such as a quick-release pin, may be used. When the apparatus 10 is to be removed from a leading bicycle, the fastener 23 is removed to detach the tubular member 12 from the leading bicycle but the arms 25 are typically left attached to the seat post clamp 4C.

An optional safety mechanism 15, illustrated in FIG. 2B, may be employed in conjunction with first embodiment 14-1 of the first attachment assembly 14 for raising the tubular member 12 to an elevated position, as shown, when the tubular member 12 is not attached to a trailing bicycle. The safety mechanism 15 serves to both increase the visibility of the cyclist and to prevent a trailing bicycle from colliding with the unattached end of the apparatus. The safety mechanism 15 may take the form of a strap and buckle assembly, an elastic cord or a suitable spring mechanism. A strap and buckle assembly, having one end looped around the rear of the seat support structure of the seat 5 and the other end looped around the tubular member 12, is shown.

Figure 3:
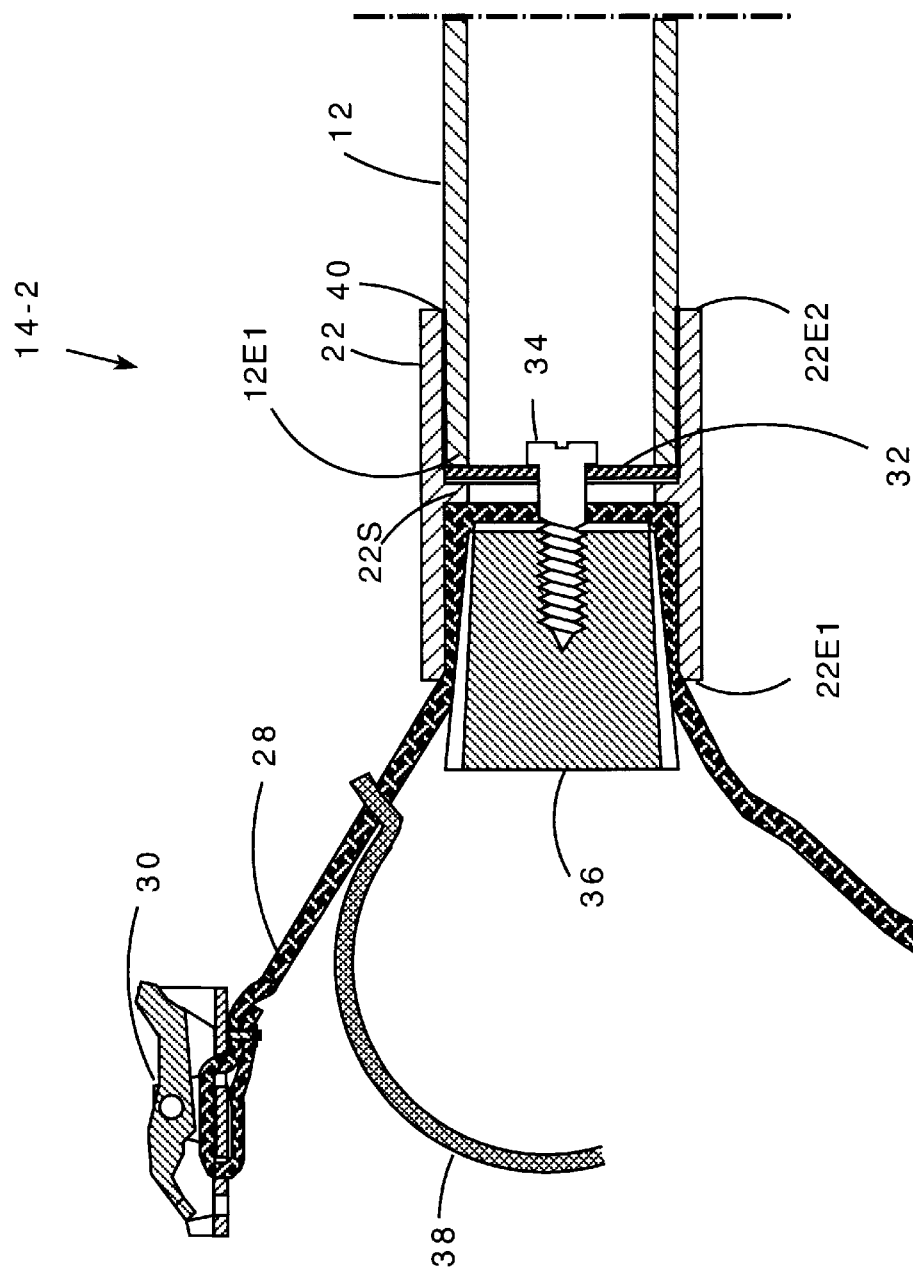
FIG. 3 is a sectional plan view of a second embodiment of a first attachment assembly.

A second embodiment 14-2 of the first attachment assembly 14, suitable for use with the second or third embodiments of the 20 alignment means is best seen in section in FIG. 3. The attachment 2 0 assembly 14-2 comprises: a PVC pipe coupling 22, having a first end 22E1, a second end 22E2, and an internal shoulder 22S; a braided polymeric fiber strap 28 with a water-resistant urethane coating and attached buckle 30, such as that sold as a bicycle toe strap; a metal disk 32, such as a sheet-metal washer; a threaded fastener 34, such as a one inch long number sixteen sheet-metal screw; and an elastomeric bumper plug 36, such as a #5 solid rubber stopper. An optional pad 38, slotted to fit over the strap 28 may be provided to prevent abrasion of the bicycle at the attachment location. The attachment assembly 14-2 is assembled by wrapping strap 28 around plug 36 and inserting strap 28 and plug 36 into a first end 22E1 of coupling 22. The threaded fastener 34 is inserted through disk 32 and inserted into a second end 22E2 of coupling 22. The fastener 34 is screwed through strap 28 and into plug 36 and tightened so that disk 32 bears against the shoulder 22S of coupling 22. A first end 12E1 of tubular member 12 is inserted into the second end 22E2 until it contacts disk 32. The tubular member 12 is affixed to the second end 22E2 of coupling 22, preferably with a suitable solvent-based PVC pipe cement 40.

Figure 4:
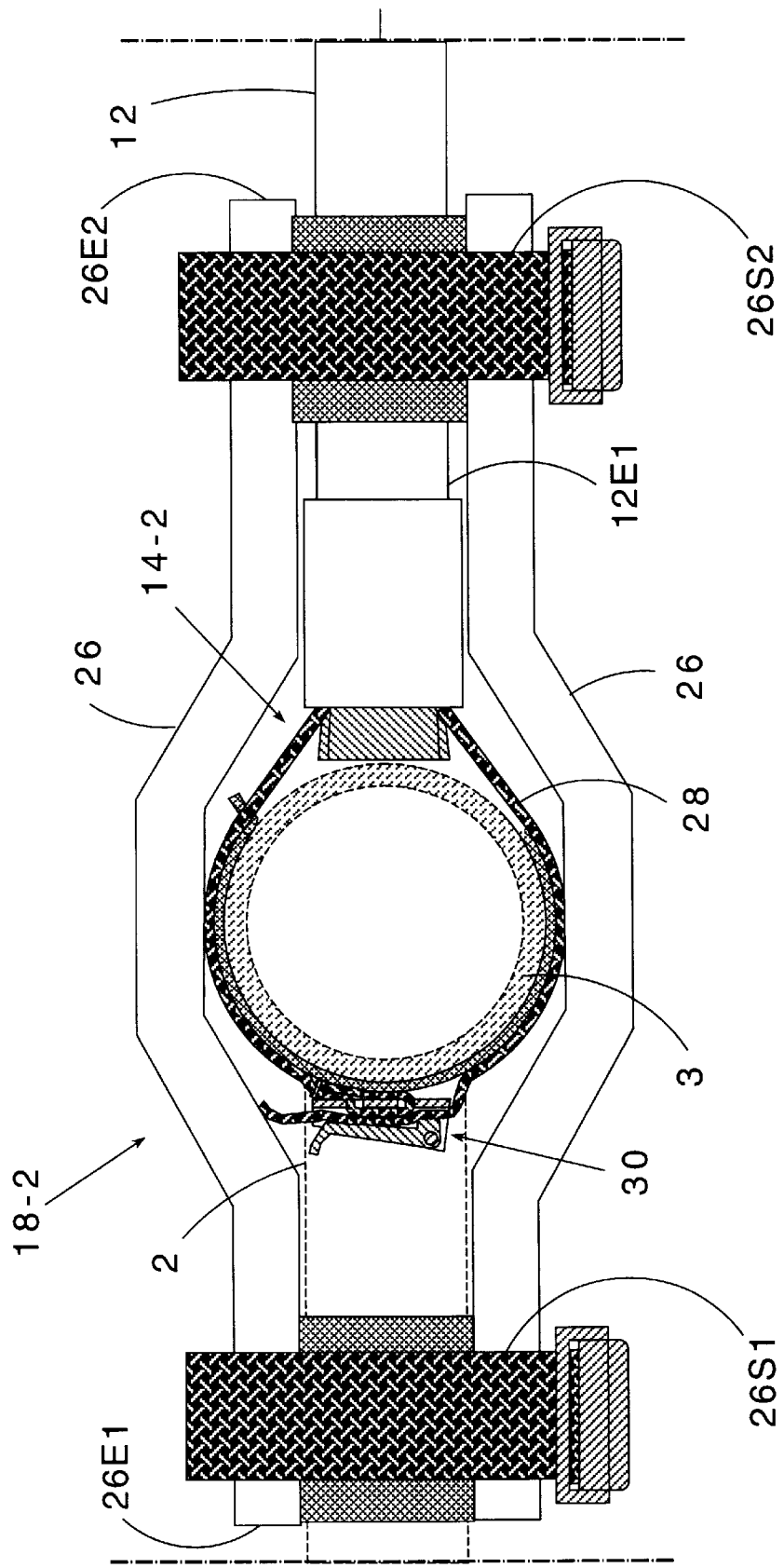
FIG. 4 is a plan view, partially in section, of the combination of a second embodiment of a first attachment assembly and a second embodiment of an alignment means.

FIG. 4 shows the combination of a second embodiment 14-2 of a first attachment assembly 14 and a second embodiment 18-2 of an alignment means 18. The strap 28 and buckle 30 is used to attach the first end 12E1 of the tubular member 12 to the seat tube 3 of the leading bicycle and the alignment means comprises at least one alignment arm 26 having a first end 26E1 and a second end 26E2, and first and second strap attachment means 26S1, 26S2 for attaching the first end 26E1 of the alignment arm 26 to the top tube 2 of the leading bicycle and the second end 26E2 of the alignment arm 26 to the tubular member 12. The arrangement shown, utilizing a pair of arms 26, suitably shaped to pass around the seat tube 3, is preferred.

Figure 5:
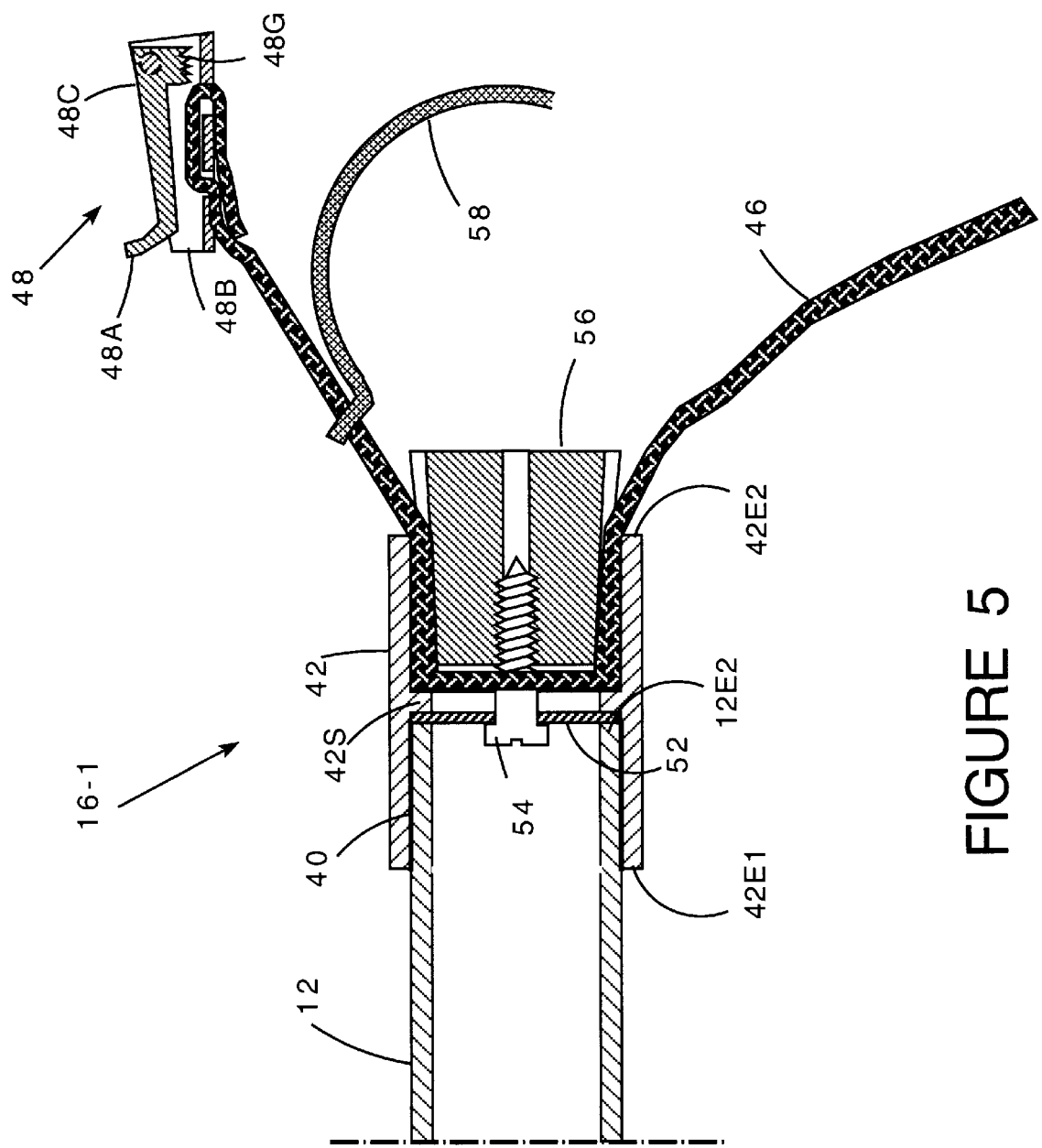
FIG. 5 is a sectional view of a first embodiment of a second attachment assembly.

A first embodiment 16-1 of the second attachment assembly 16, best seen in section in FIG. 5, comprises: a PVC pipe coupling 42, of the type intended to couple a PVC pipe to another PVC pipe, having a first end 42E1, a second end 42E2, and an internal shoulder 42S; a braided polymeric fiber strap 46, such as that sold as a bicycle toe strap, having a water-resistant urethane coating and an attached buckle 48; a metal disk 52, such as a sheet-metal washer; a threaded fastener 54, such as a one inch long number sixteen sheet-metal screw; and an elastomeric bumper plug 56, such as a

5 one-hole rubber stopper. An optional pad 58 (similar to pad 38), slotted to fit over the strap 46 may be provided. The attachment assembly 16-1 is assembled by wrapping strap 46 around plug 56 and inserting strap 46 and plug 56 into a second end 42E2 of coupling 42. The threaded fastener 54 is inserted through disk 52 and inserted into a first end 42E1 of coupling 42. The fastener 54 is screwed through strap 46 and into plug 56 and tightened so that disk 52 bears against the shoulder 42S of coupling 42. A second end 12E2 of tubular member 12 is inserted into the first end 42E1 until it contacts disk 52. The tubular member 12 is affixed to the first end 42E1 of coupling 42, preferably with a suitable solvent-based PVC pipe cement 40.

A commercial cam buckle 48, available from various sources, comprising a base 48B and a cam 48C, made of an engineering polymer, is preferred for the second attachment assembly. In such a buckle the cam 48C engages the strap 46 with a grip portion 48G actuated by an arm portion 48A which also facilitates rapid release of strap 46 from the cam buckle 48. The cam buckle is preferred for at least the second attachment assembly so that the rider of the trailing bicycle may initiate rapid disconnection of the apparatus 10 from the trailing bicycle by merely lifting the arm 48A of the cam 48C. The arm 48A may be lengthened or otherwise modified from the standard shape of the commercial cam buckle to further facilitate access by the rider, if desired.

In the event of a mishap, when excessive forces are encountered, it is desirable that the second attachment assembly separate from the trailing bicycle before the first attachment assembly separates from the leading bicycle. To insure that this takes place, two separation mechanisms are provided in the second attachment assembly. First, when excessive force is applied the polymeric base 48B of the cam buckle will flex, allowing the cam 48C to separate from the base, thereby releasing the apparatus 10 from the trailing bicycle. Second, if the cam buckle does not release, the threaded fastener 54 will pull out of the elastomeric plug 56 of the second attachment assembly 16 at a force lower than that required for the threaded fastener 34 to pull out of the elastomeric plug 36 of the first attachment assembly 14. In an arrangement of the invention having strap and buckle attachment assemblies at both ends of the tubular member, this is accomplished by the use of a solid elastomeric bumper plug 36 in the first attachment assembly and a one-hole elastomeric bumper plug 56 in the second attachment assembly. The size of the fastener 54 and the size of the hole in the bumper 56 may be selected to achieve the desired detachment force.

Figure 6:
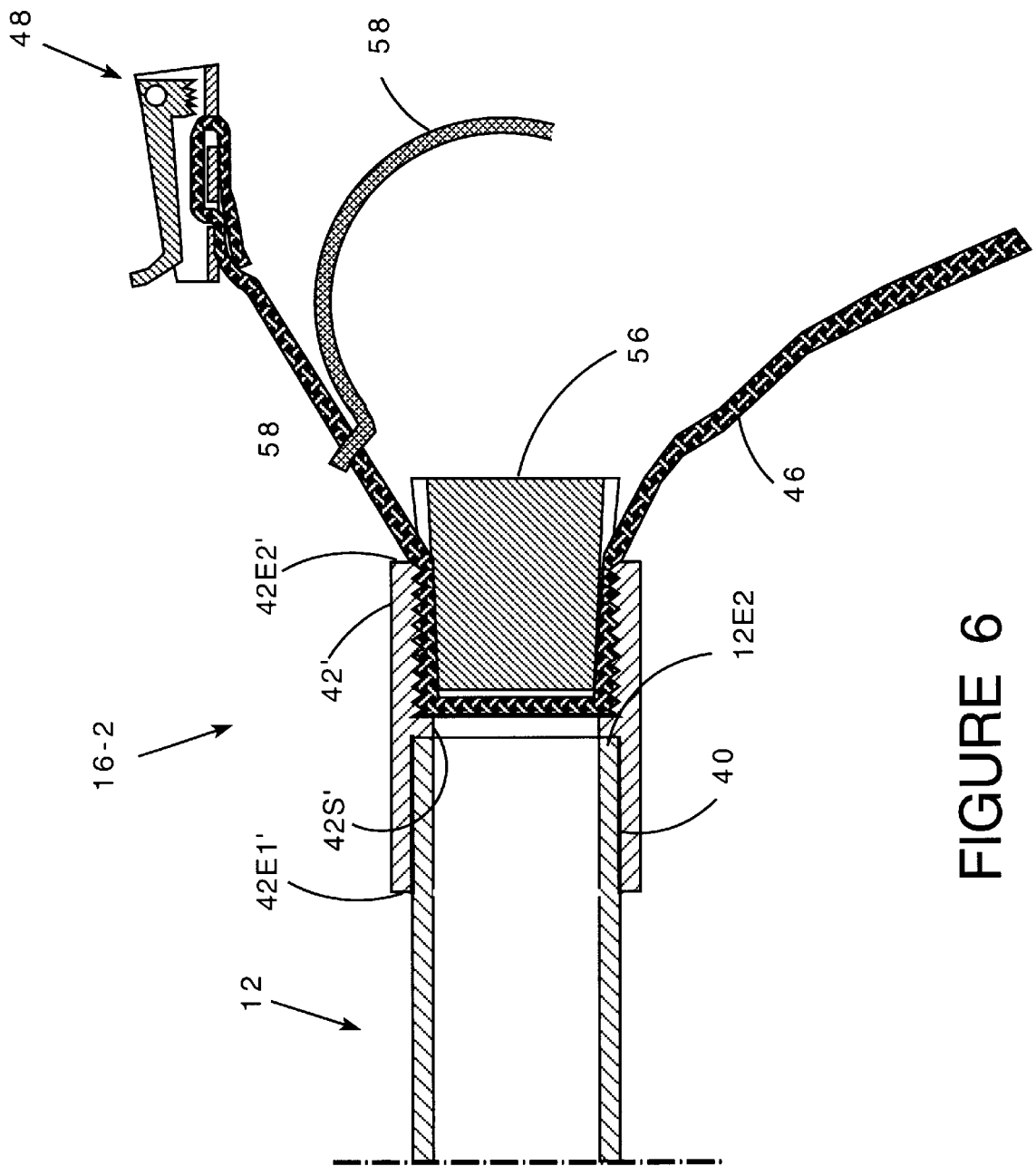
FIG. 6 is a sectional view of a second embodiment of a second attachment assembly.

A second embodiment 16-2 of the second attachment assembly 16, best seen in FIG. 6, comprises: a PVC pipe coupling 42', of the type intended to couple PVC pipe to threaded metal pipe, having a first end 42E1', a threaded second end 42E2', and an internal shoulder 42S'; a braided polymeric fiber strap 46; a cam buckle 48, attached to strap 46; and an elastomeric bumper plug 56, such as a #5 rubber stopper. An optional cushioned pad 58, slotted to fit over the strap 46 may be provided. The second end 12E2 of tubular member 12 is inserted into and affixed to the first end 42E2' of the coupling 42' with a suitable solvent-based PVC pipe cement 40.

The attachment assembly 16-2 is assembled by wrapping strap 46 around bumper plug 56 and inserting strap 46 and plug 56 into the threaded second end 42E2' of coupling 42'. The strap 46 and plug 56 may either be pressed into or be threaded into the threaded second end 42E2' of the coupling 42'. As the strap 46 and plug 56 are inserted into the threaded second end 42E2' the strap 46 will be forced into conformance with the shape of the threads of the threaded second end 42E2' of coupling 42' and the strap 46 and plug 56 will be gripped with a holding force proportional to the distance of insertion. The plug 56 may be optionally tapered, as shown. By inserting the strap 46 and plug 56 a predetermined distance into second end 42E2' it has been found that a predetermined pull-out force may be established. This predetermined pull-out force is selected to be less than the separation force for the first attachment assembly 14, so that in the event of a mishap which causes an excessive force to be applied to the apparatus, the second attachment assembly 16 will separate, automatically detaching the coupling 42' from the strap 46, which remains attached to the trailing bicycle 6 (seen in FIG. 1).

Figure 7:
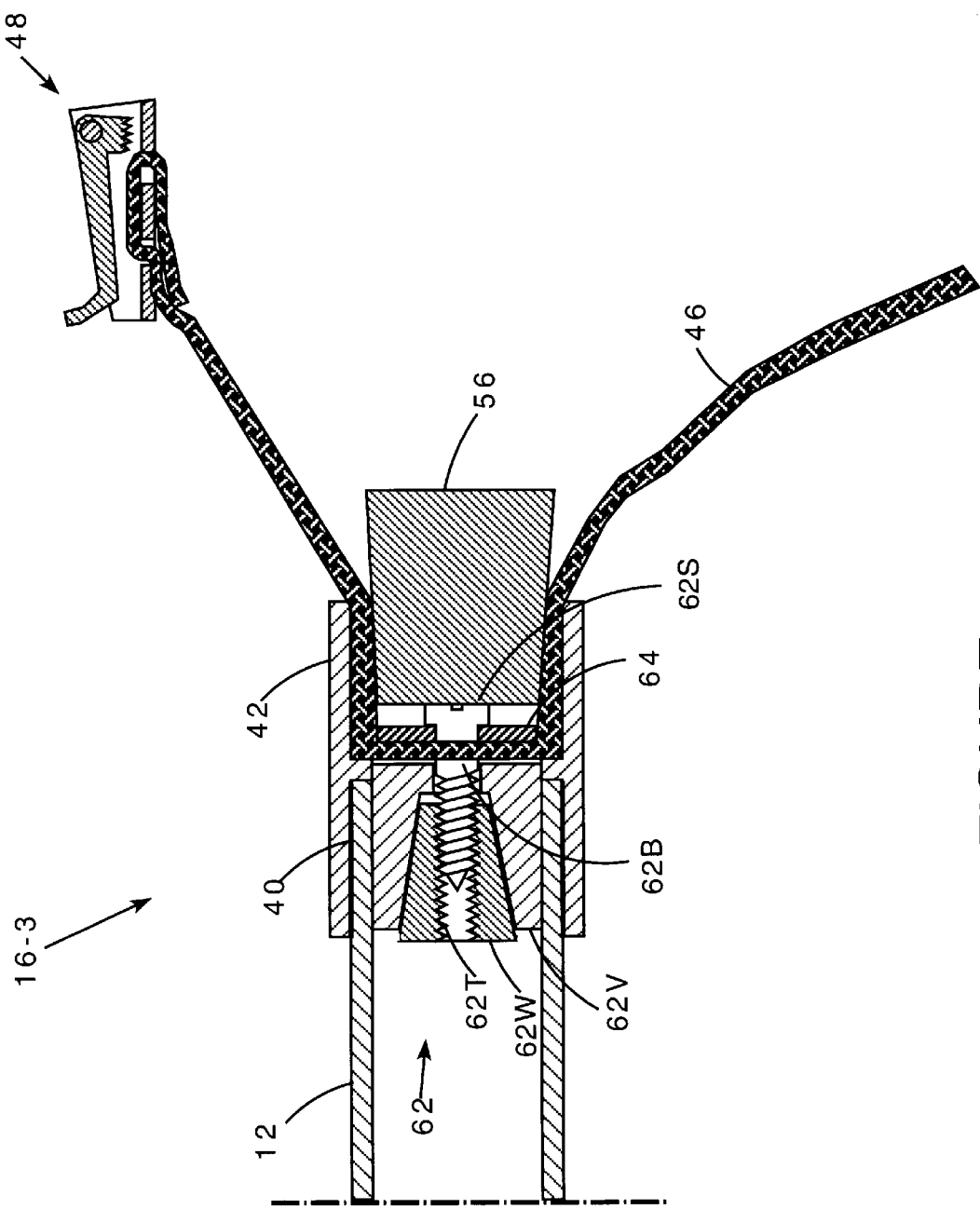
FIG. 7 is a sectional view of a third embodiment of a second attachment assembly.

A third embodiment 16-3 of the second attachment assembly 16, best seen in FIG. 7, comprises a first strap and buckle coupling assembly 46, 48 being attached to the tubular member 12 by a wedge-type coupling plug 62. The coupling plug 62 comprises a wedge 62W, a plug 62V and a screw 62S. The plug 62V has a V-shaped opening for receiving the wedge 62W and a central bore 62B for receiving the body portion of screw 62S. The wedge 62W has a central threaded bore 62T for receiving the threaded portion of screw 62S.

A rigid metal or polymeric disk 64 receives the strap 46 and the screw 62S, the wedge-type coupling plug 62 being inserted into the tubular member 12, the wedge 62W being drawn into the V-shaped plug 62V by the screw 62S, causing the V-shaped plug 62V to expand and grip the inner walls of the tubular member 12, the 25 screw 62S being tightened to a predetermined torque, the torque determining the predetermined detachment force of the coupling plug 62 from the tubular member 12. The third embodiment 16-3 typically includes a coupling 42, as shown, which serves to strengthen the tubular member 12, so that a higher detachment force of the coupling plug 62 from the tubular member 12 may be achieved. A bumper plug 56 is then inserted into the coupling 42 as shown. Optionally the wedge-type plug 62 may be inserted directly into the second end 12E2 of tubular member 12 without the use of the coupling 42. The bumper plug 56 may be inserted into the end 12E2 of tubular member 12.

Figure 8B:
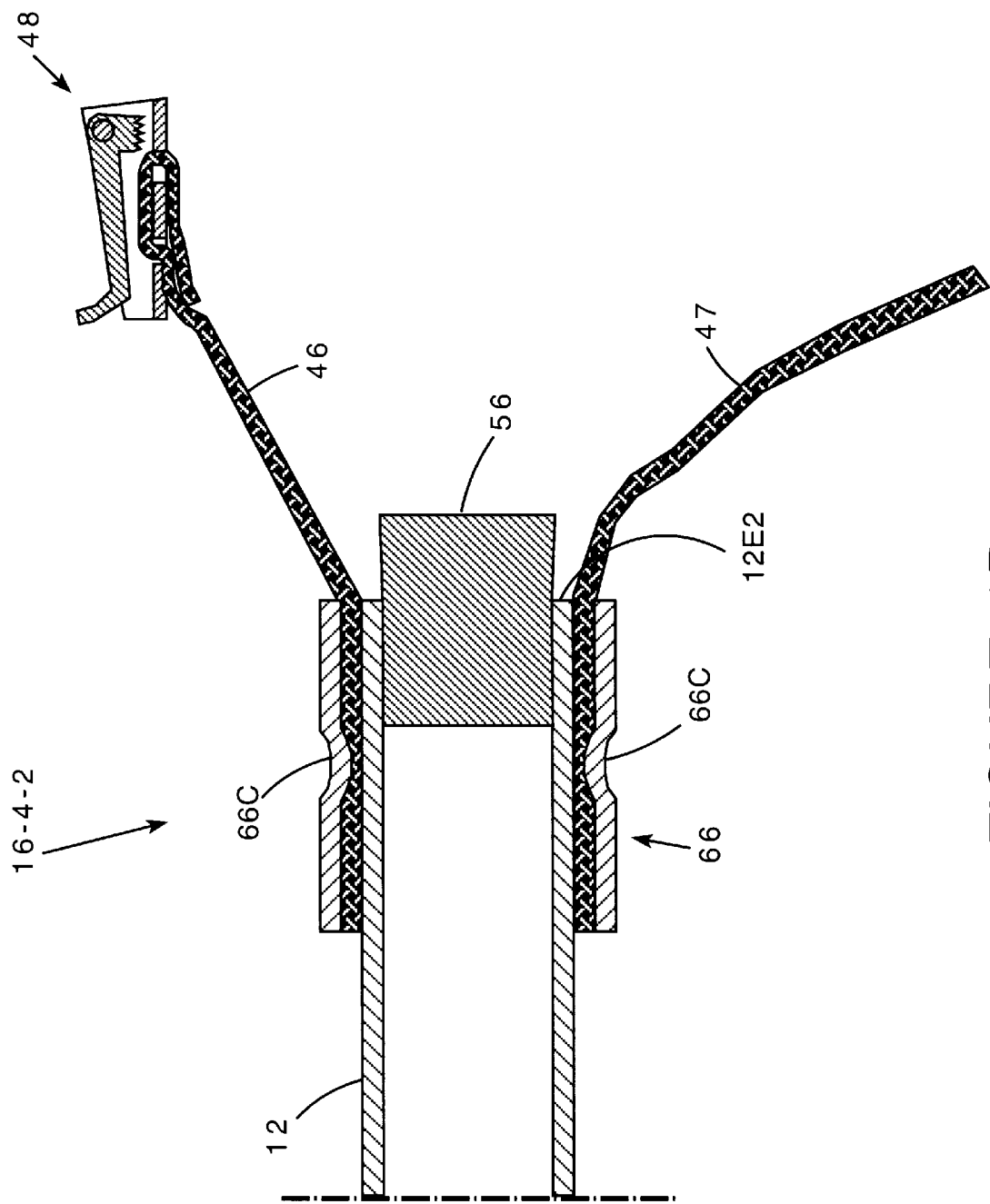

A fourth embodiment 16-4 of the second attachment assembly, best seen in FIGS. 8A and 8B, comprises a strap and buckle arrangement being attached to the tubular member 12 by crimping. In a first arrangement 16-4-1 of the fourth embodiment 16-4 of the second attachment assembly 16, seen in FIG. 8A, a ferrule 66, preferably a metal ferrule, having a predetermined inner diameter and predetermined wall thickness, is used to hold a two-piece strap comprising straps 46, 47 on the tubular member 12. The two-piece strap, comprising straps 46, 47, is first positioned along the tubular member 12 adjacent to the second end 12E2 and the ferrule 66 is then pressed onto the end 12E2 of the tubular member 12. The separation means for this first arrangement 16-4-1 of this fourth embodiment comprises the outer diameter of the tubular member and the inner diameter of the ferrule being of predetermined dimensions, and the tubular member 12 having a predetermined compressibility, so that the straps 46, 47 will pull out of the ferrule when a predetermined force has been reached.

In a second arrangement 16-4-2 of this fourth embodiment 16-4, seen in FIG. 8B, a ferrule 66, preferably a metal ferrule having a predetermined inner diameter and predetermined wall thickness, is slipped over a two-piece strap, comprising straps 46, 47, which have been positioned along the tubular member 12 adjacent to the second end 12E2. The ferrule 66 is then crimped, as shown at 66C, to hold the two-piece strap 46, 47 to the tubular member 12.

The separation means for the second arrangement 16-4-2 of this fourth embodiment comprises the crimp 66C being of a predetermined depth and length, and the tubular member 12 having a predetermined compressibility, so that the straps 46, 47 will pull out of the ferrule when the predetermined force has been reached, thereby detaching the second end 12E2 of the tubular member from the trailing bicycle.

Figure 9A:
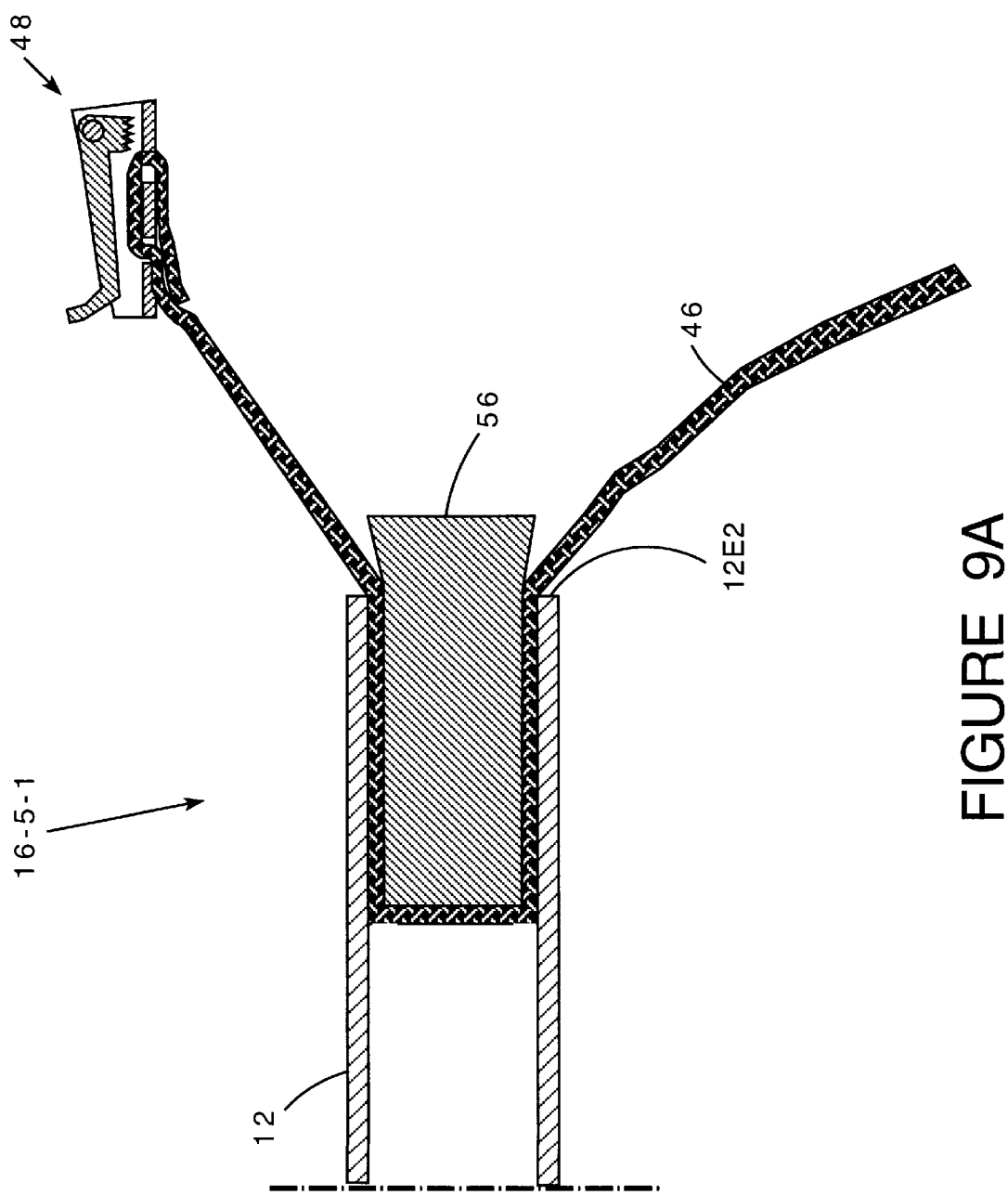
FIGS. 9A and 9B are sectional views of two arrangements of a fifth embodiment of a second attachment assembly.

In a first arrangement 16-5-1 of a fifth embodiment 16-5 of the second attachment assembly 16, seen in FIG. 9A, a one-piece strap 46 is wrapped around a plug 56 and the strap 46 and plug 56 are pressed into a second end 12E2 of tubular member 12. The separation means for this first arrangement of this fifth embodiment comprises the tubular member 12 having a predetermined inner diameter, the plug 56 being of a predetermined diameter and length, and the plug 56 having a predetermined compressibility, so that the strap 46 will pull out of the ferrule when the predetermined force has been reached, thereby detaching the second end 12E2 of the tubular member 12 from the trailing bicycle.

Figure 9B:
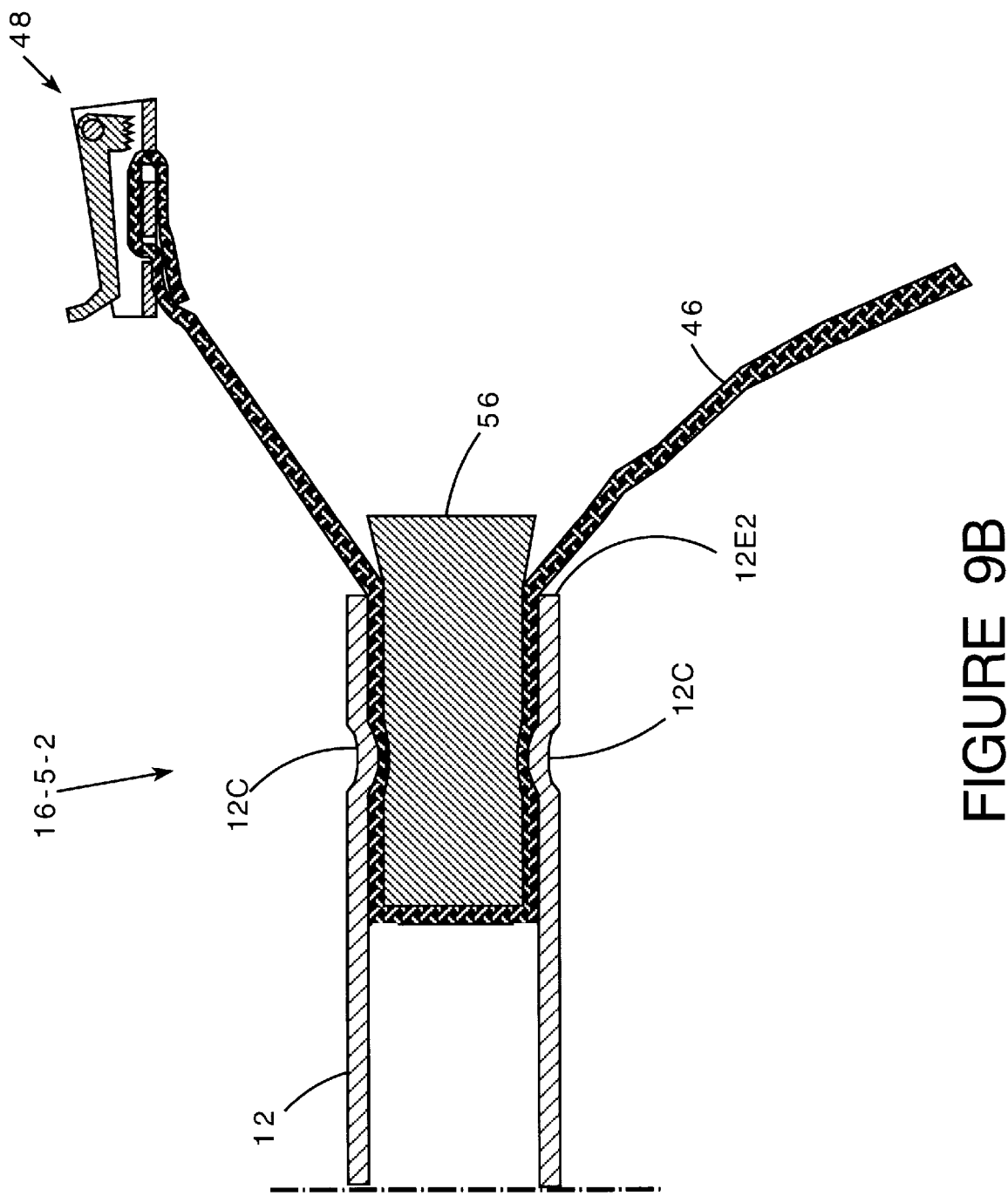

In a second arrangement 16-5-2 of the fifth embodiment 16-5 of the second attachment assembly 16, seen in FIG. 9B, a one piece strap 46 is wrapped around a plug 56 and the strap 46 and plug 56 are inserted into the second end 12E2 of tubular member 12. The tubular member is then crimped at 12C to hold the strap 46 and plug 56 to the tubular member 12. The separation means for the second arrangement of this fifth embodiment comprises the crimp 12C being of a predetermined depth and length, and the plug 56 having a predetermined compressibility, so that the strap 46 will pull out of the tubular member 12 when the predetermined force has been reached, thereby detaching the second end 12E2 of the tubular member from the trailing bicycle.

Figure 10:
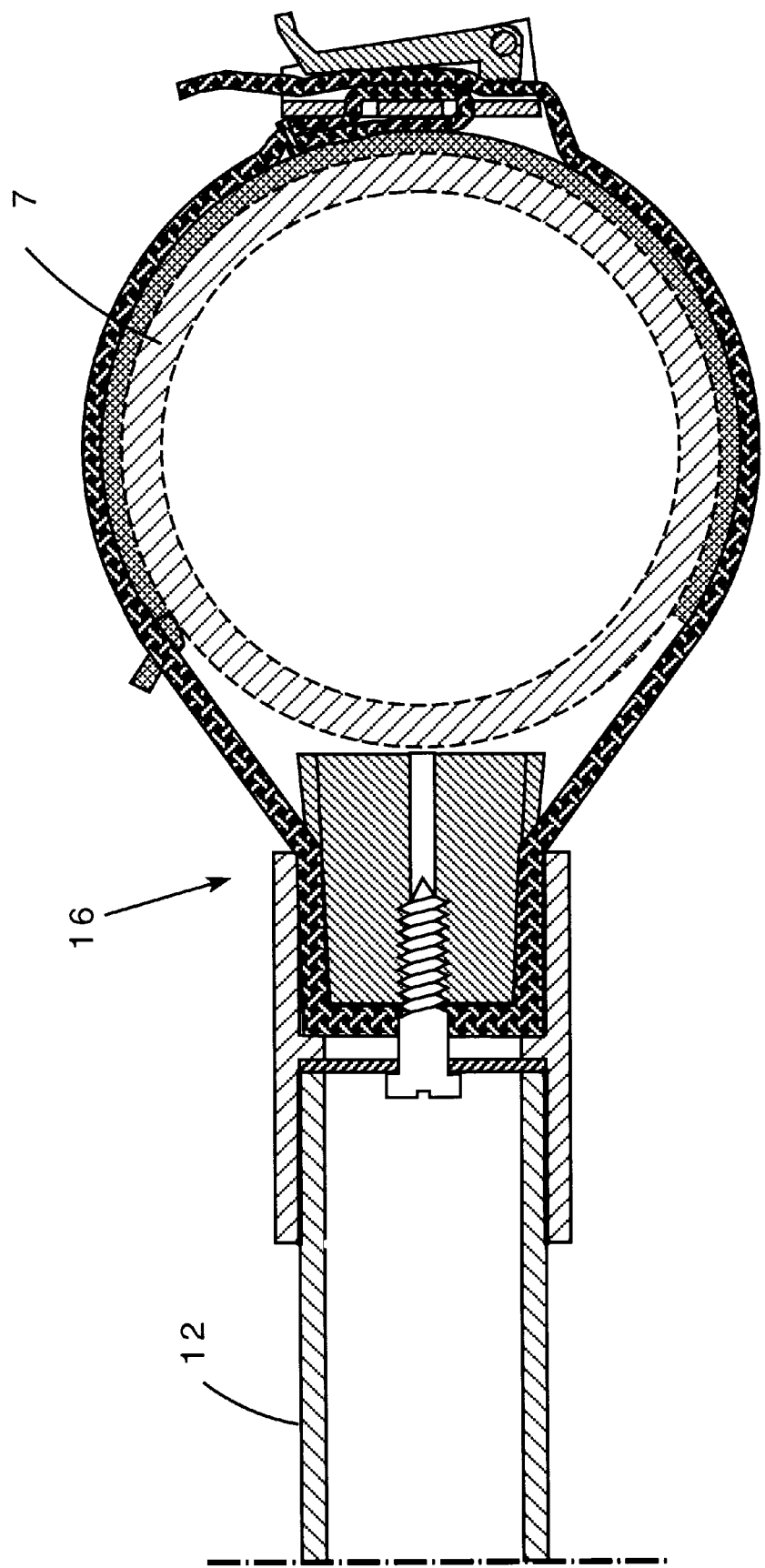
FIGS. 10 and 11 are, respectively, a sectional plan view and an elevational view, showing the present invention attached to a trailing bicycle.
Figure 11:
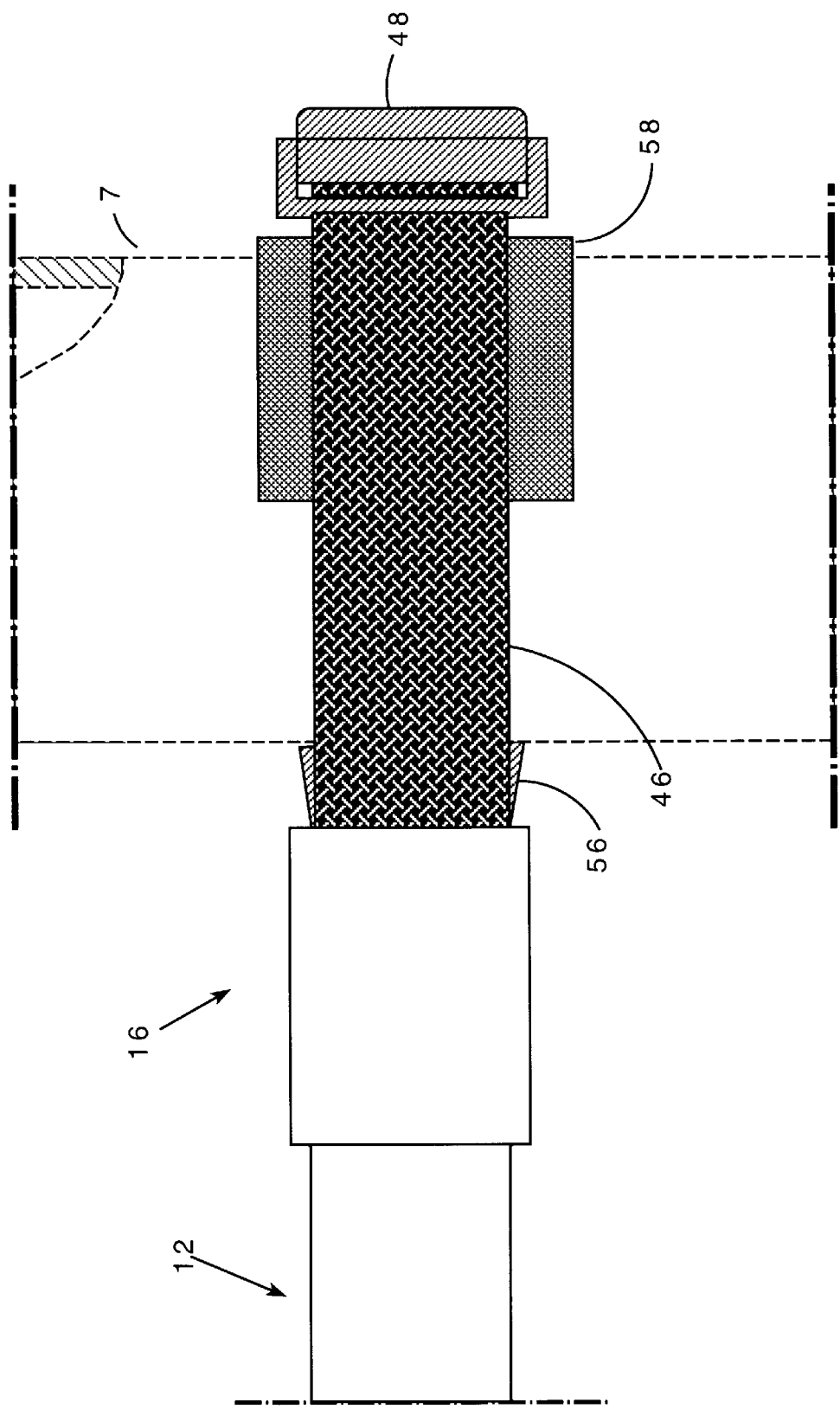

FIGS. 10 and 11 are, respectively, a sectional plan view and an elevational view, showing the apparatus 10 attached to a trailing bicycle 6. FIGS. 10 and 11 provide better detailed views of the arrangement of the components of the second attachment assembly 16 when attached to the head tube 7 of a trailing bicycle 6.

Figure 12:
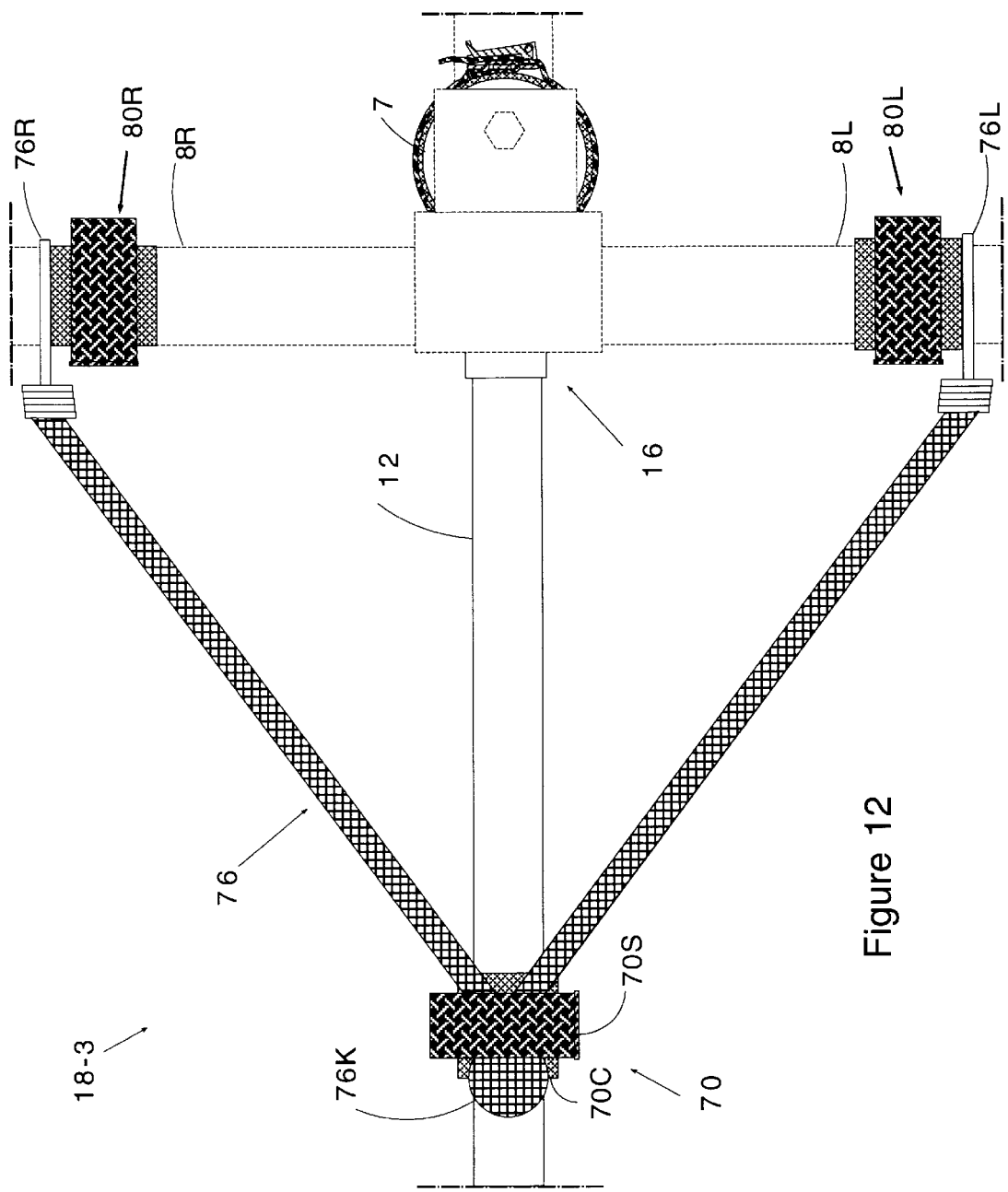
FIG. 12 is a plan view that shows the elements of a third embodiment of the alignment means.

FIG. 12 is a plan view that shows the elements of the present invention having a third alignment means 18-3. The third alignment means 18-3 comprises an attachment clamp assembly 70, comprising a clamp saddle 70C and a strap 70S, attached to the tubular member 12 at a point approximately one third the member length from the second end, an elastic cord 76 having a first end 76R, and a second end 76L, and a midpoint. The midpoint of the elastic cord 76R is attached to the attachment clamp 70, and the respective ends 76R, 76L of the elastic cords are attached to respective sides 8R, 8L of the handlebar of the trailing bicycle. Additional clamps 80R, 80L, similar to clamp 70, may be used to position the attachment points of the elastic cord ends 76R, 76L to the handlebar. Using this embodiment of the alignment means, when the trailing bicycle is tracking out of alignment with the leading bicycle, an aligning force is exerted by the elastic cords 76R, 76L upon the trailing bicycle to keep the trailing bicycle in substantial alignment with the leading bicycle. In a preferred arrangement the attachment clamp assembly 70 comprises the storage strap assembly 20. The elastic cord 76 is knotted at its midpoint to form a knot 76K and the knot 76K is inserted through the saddle of the clamp 70C and the hook and loop strap 70S is tightly wrapped around the tubular member 12, the saddle and the elastic cord 76. The combination of the knot 76K, the clamp 70C and the strap 70S comprises an elastic release mechanism that releases the elastic cords 76 when a predetermined force has been reached. In this embodiment the elastic release mechanism comprises part of the separation means for automatically detaching the second end of the tubular member 12 from the trailing bicycle. The rider of the trailing bicycle may release the alignment means 18-4 from the tubular member 12 by simply pulling on the end of the strap 70S.

Figure 13:
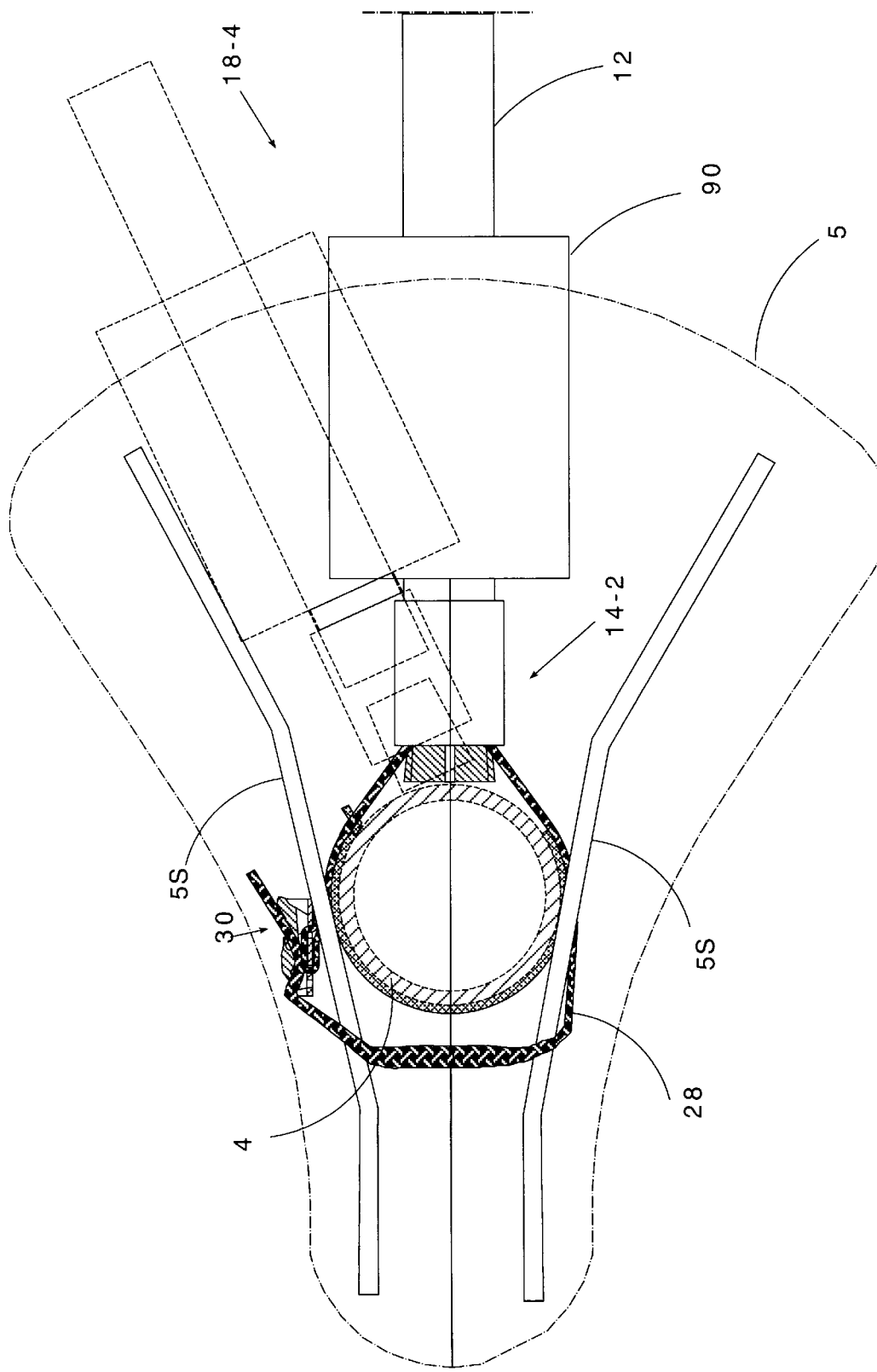
FIG. 13 is a plan view, partially in section, that shows the elements of a fourth embodiment of the alignment means.

FIG. 13 is a plan view partially in section that illustrates a fourth alignment means 18-4. For clarity the seat 5 is shown as a dot-dash outline only. The fourth alignment means 18-4 comprises a resilient sleeve 90 in combination with the second embodiment 14-2 of the first attachment means 14. The resilient sleeve 90 is attached to the tubular member 12 adjacent the first attachment means 14-2. The first attachment means 14-2 is attached to the seat support structure 5S of the leading bicycle by passing the strap 28 around the seat post 4 and over the seat support structure 5S and fastening the strap 28 with buckle 30. When so attached to the leading bicycle, the seat support structure 5S will limit the lateral travel of the tubular member 12 relative to the leading bicycle. The resilient sleeve 90 is typically made of a resilient high density foam and is attached to the tubular member 12 in any convenient manner. A dashed-line representation of the tubular member 12 at its limit of lateral motion is shown.

It may be readily appreciated that various combinations of the described features of the described embodiments may be achieved. It will be appreciated by one skilled in the mechanical arts that the various embodiments may be effected if desired by making the apparatus 10 as an integrally molded single piece instead of assembling multiple pieces as has been described. Such combinations or single-piece embodiments are considered to be within the scope of the invention.

I claim:

1. An improved apparatus for linking a leading bicycle and a trailing bicycle in a tandem arrangement by means of a tubular member adapted to be connected to each of the bicycles, comprising:

a) a first attachment means for attaching the apparatus to the leading bicycle, the first attachment means being affixed to a first end of the tubular member;

b) a second attachment means for attaching the apparatus to the trailing bicycle comprising a strap and a quick-release buckle, the second attachment means being affixed to a second end of the tubular member, the second attachment means also comprising a separation means for detaching the second end of the tubular member from the trailing bicycle when a predetermined force has been reached; wherein the first attachment means comprises:

a pipe coupling, a strap assembly, an elastomeric plug, a metal washer and a screw;

the pipe coupling having a first end portion, a second end portion and a central inner ridge portion, the first end portion of the pipe coupling receiving the strap assembly and the elastomeric plug, the second end portion of the pipe coupling receiving the washer and the screw, so that the washer bears against the central ridge portion of the pipe coupling, the screw extends through the washer, through the strap assembly and into the elastomeric plug to hold the strap assembly and the plug in the first end portion of the pipe coupling;

the second end portion of the pipe coupling being adhesively affixed to the tubular member, the screw being of a predetermined diameter, pitch, and length, the elastomeric plug being solid and receiving the screw, so that the screw will pull out of the elastomeric plug only when a force substantially greater than the predetermined force of the separation means has been reached, thereby preventing detachment of the first end of the tubular member from the leading bicycle.

2. An improved apparatus for linking a leading bicycle and a trailing bicycle in a tandem arrangement by means of a tubular member adapted to be connected to each of the bicycles, comprising:

a) a first attachment means for attaching the apparatus to the leading bicycle, the first attachment means being affixed to a first end of the tubular member;

b) a second attachment means for attaching the apparatus to the trailing bicycle comprising a strap and a quick-release buckle, the second attachment means being affixed to a second end of the tubular member, the second attachment means also comprising a separation means for detaching the second end of the tubular member from the trailing bicycle when a predetermined force has been reached wherein the second attachment means comprises:

a pipe coupling, a strap assembly, an elastomeric plug, a metal washer and a screw;

the pipe coupling having a first end portion, a second end portion and a central inner ridge portion, the first end portion of the pipe coupling receiving the washer and the screw, the second end portion of the pipe coupling receiving the strap and the elastomeric plug, the washer bearing against the central ridge portion of the pipe coupling, the screw extending through the washer, through the strap and into the elastomeric plug to hold the strap and the plug in the second end portion of the pipe coupling;

the first end portion of the pipe coupling being adhesively affixed to the tubular member, the separation means comprising the screw being of a predetermined diameter, pitch, and length, and the elastomeric plug having a central bore of a predetermined diameter for receiving the screw, so that the screw will pull out of the elastomeric plug when the predetermined force has been reached, thereby detaching the second end of the tubular member from the trailing bicycle.

3. The apparatus of claim 2 wherein the quick release buckle of the second attachment means comprises a base and a cam made of polymeric material, being, operative so that the cam will separate from the base when the predetermined force has been reached, thereby detaching the second end of the tubular member from the trailing bicycle.

4. The apparatus of claim 2 wherein each attachment means further comprises an elastomeric shock absorbing element.

5. A combination assembly of a leading bicycle, a trailing bicycle and an improved apparatus for linking the leading bicycle and the trailing bicycle in a tandem arrangement by means of a tubular member adapted to be connected to each of the bicycles, comprising:

a) a first attachment means for attaching the apparatus to the leading bicycle, the first attachment means being affixed to a first end of the tubular member;

b) a second attachment means for attaching the apparatus to the trailing bicycle comprising a second strap and a quick-release buckle, the second attachment means being affixed to a second end of the tubular member, the second attachment means also comprising a separation means for detaching the second end of the tubular member from the trailing bicycle when a predetermined force has been reached;

c) alignment means for causing the training bicycle to track in substantial alignment with the leading bicycle wherein the alignment means comprises means for attachment to a seat of the leading bicycle, the seat having two support members, whereby, when the apparatus is attached to the leading bicycle and the trailing bicycle, the seat support members limit the lateral movement of the tubular member and thus cause the tubular member to remain substantially aligned with the leading bicycle, thereby causing the trailing bicycle to track in substantial alignment with the leading bicycle.

6. The combination assembly of a leading bicycle, a trailing bicycle and an improved apparatus of claim 5 wherein the first attachment means comprises a strap and buckle for attaching the first end of the tubular member to a seat support assembly of the leading bicycle and the alignment means comprises a resilient bumper attached to the tubular member adjacent to the first end of the tubular member, so that, when the trailing bicycle is tracking out of alignment with the leading bicycle, an aligning force is exerted by the resilient bumper one of contacting the seat support members to keep the trailing bicycle in substantial alignment with the leading bicycle.

7. The combination assembly of a leading bicycle, a trailing bicycle and an improved apparatus of claim 6 further comprising a storage assembly, comprising a storage strap, mounted approximately at the midpoint of the tubular member, the storage strap being attached to the top tube of a bicycle, so that the apparatus may be carried in a stowed position on the bicycle.

* * * * *